Figure 1:
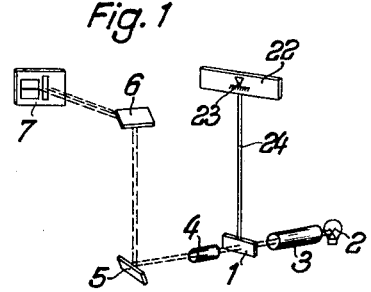

Sept. 24, 1957 K. WAGNER 2,807,189
PROJECTING PRECISION AND ANALYTICAL BALANCES HAVING
A POINTER WITH AUTOMATIC INDICATING MEANS
Filed Oct. 26, 1954 3 Sheets-Sheet 1

Inventor:
KURT WAGNER
BY
AGENT

Sept. 24, 1957 K. WAGNER 2,807,189
PROJECTING PRECISION AND ANALYTICAL BALANCES HAVING
A POINTER WITH AUTOMATIC INDICATING MEANS
Filed Oct. 26, 1954 3 Sheets-Sheet 2
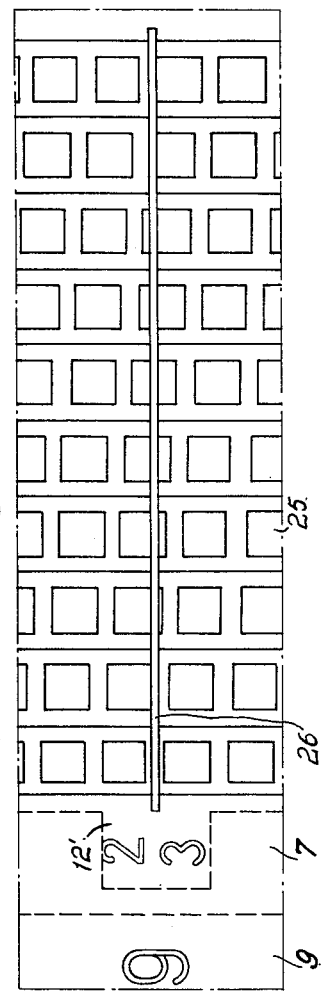
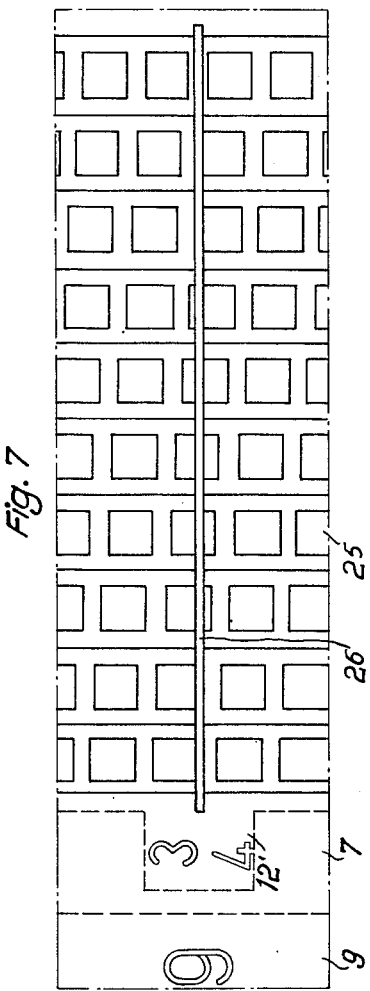
Inventor:
KURT WAGNER
BY
Hans G. Joseph
AGENT United States Patent Office 2,807,189
Patented Sept. 24, 1957

2,807,189

PROJECTING PRECISION AND ANALYTICAL BALANCES HAVING A POINTER WITH AUTOMATIC INDICATING MEANS

Kurt Wagner, Ebingen, Wurttemberg, Germany, assignor to August Sauter K. G., Ebingen, Wurttemberg, Germany Application October 26, 1954, Serial No. 464,847

Claims priority, application Germany October 29, 1953

4 Claims. (Cl. 88—24)

This invention relates to precision balances, such as analytical balances.

Development in the construction of fine balances takes the direction of convenient, dependable, and more rapid handling of precision and analytical balances. One means of achieving this is the elimination of the placing of the weights in position by hand from a special set of weights, the different weights used having to be added together, which may easily lead to errors, particularly in the case of the small weights representing fractions of grammes. The different weight setting devices which can be operated from the outside in the case of a closed housing, still have the defect of requiring a certain amount of adjustment work. This defect is eliminated by automatic indicating devices, in which a micro-scale fastened to the pointer and constructed as a diapositive is depicted on an enlarged scale on a ground glass screen with the aid of an optical lens system which mainly consists of the source of light, a condenser, and a lens, whereby the deflections of the pointer are rendered visible. In the two-pan analytical and precision balance, this micro-scale is usually divided into 100 parts on the right and 100 parts on the left of the zero point, and in the case of the single-pan analytical or precision balance is divided into 100 parts starting from the zero point situated at the end of the scale. In the customary analytical balances having a maximum load of 200 grammes, the scale thus comprises either a range from 0 to 10 mg. with graduations of $\frac{1}{10}$ mg., or a range from 0 to 100 mg., with graduations of 1 mg. With the aid of a vernier reading device in the case of the balance the scale of which extends to 100 mg., it is thus possible to weigh and read automatically in graduations of 0.1 mg. up to 10 or 100 mg., as the case may be without placing weights in position. The automatic indication thus permits a reading of 3 decimals.

In illuminated image scales for current measuring instruments it has been proposed to provide on the ground glass screen, instead of the vernier scale, a 10-place transverse scale and to connect the dividing lines of the micro-scale by sawtooth-like inclined lines. Here again the use of a 100-part micro-scale permits a reading to three decimals.

It is now one object of the invention to extend by one decimal this automatic range of weighing by improving the reading of the deflection of the pointer, so that said range will embrace four decimals. Without using weights it will then for example be possible to weigh from $\frac{1}{10}$ mg. to 999.9 mg. automatically with an analytical balance. It will then be necessary to use weights only from 1 gramme upwards, and these weights can be placed in positions either by hand or by positioning devices, whereby a substantial simplification of the handling of the balance is achieved.

This arrangement is also applicable to simple precision balances having a weighing range from 10 mg. to 100 grammes. With a scale division of 10 mg., it is then possible to carry out entirely automatically, and without using a single weight which requires to be placed in position, all weighings from 10 mg. to 100 grammes.

The most obvious step would be to enlarge the scale for this purpose, and accordingly to work with a larger angle of deflection and to accommodate 1,000 units on the micro-scale on each side of the zero line. This solution is however not feasible, because with larger angular deflections the error in the indication amounts to a multiple of the smallest graduation unit, so that an irregularly divided scale is necessary to compensate for this error. This however renders impossible working with a vernier or transverse scale. In addition, analytical and precision balances, with their necessary flat bearing points, cannot tolerate large angular deflections if accuracy and consistency of indication are not to suffer.

A reduction of the graduation spaces is likewise not possible. The length of micro-scales used at the present time amounts to about 7 to 10 mm. for each 100 scale divisions. Although, despite certain difficulties, it is still possible to accommodate 1,000 scale divisions on so small a scale length, the sacrifice must be made that the lines and figures have unsharp edges, and easily appear dirty through micro-dust, thus giving a poor image on the ground glass screen. In addition, it is not sufficient to retain the previous scale length, unless the length of the pointer can be increased, because although with the relatively coarse graduation of 100 scale divisions hitherto used the angular error is not apparent, yet with a division into 1,000 parts this error will amount to several scale divisions. It is therefore necessary to reduce the angular deflections of the balance, which were hitherto already relatively small, beneath the hitherto customary value, if the angular error is to amount to not more than $\frac{1}{3}$ to $\frac{1}{4}$ of a scale division with 10,000 scale units.

The difficulties indicated can according to the invention be avoided by dividing the (correspondingly shortened) micro-scale as hitherto into 100 parts, but by magnifying them so much during projection that in each case only one scale division covers the ground glass screen scale, which constitutes a 100 division comparison scale. In order to facilitate the reading, the latter is disposed on a flat surface in the style of a transverse scale.

The smaller deflection of the weighing beam required for the necessary elimination of the angular error permitted by the invention is very advantageous. It is thereby possible to locate the centre of gravity lower than usual, whereby the balance comes to rest more quickly and is more consistent in indication, so that greater accuracy of weighing can thereby be obtained. In addition, through the smaller angular movement there is less wear on the knife edges, so that the strain on the balance is diminished and it retains its initial accuracy longer than usual.

Figure 2:
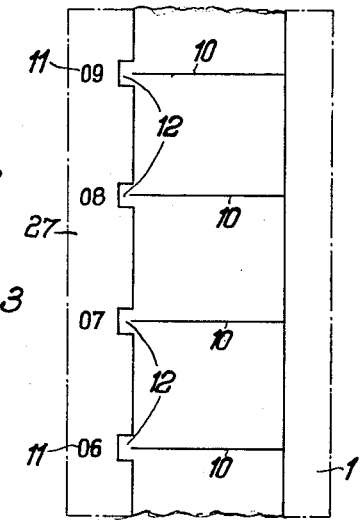
Figure 3:
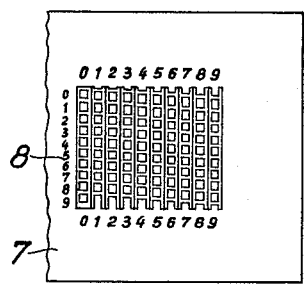
Figure 4:
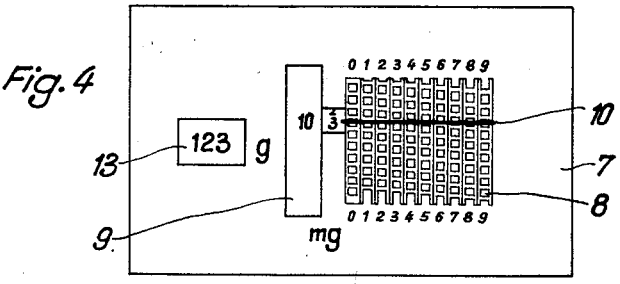
Figure 5:
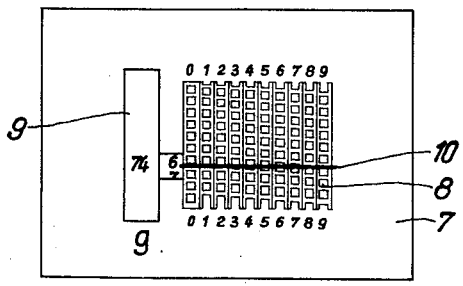
Figure 8:
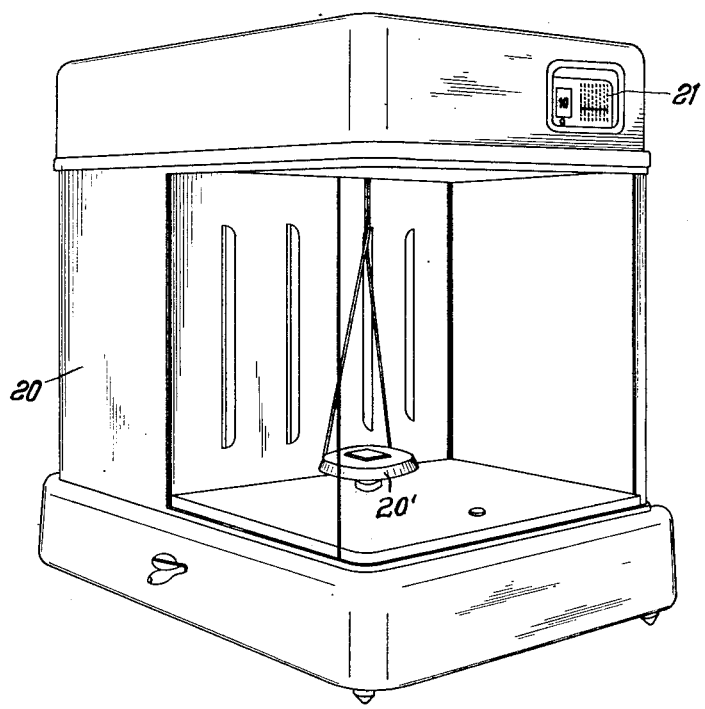

Further details and advantages of the invention can be seen from the description of some exemplified embodiments, with reference to the accompanying drawings, in which:

Figure 1 is a diagrammatic representation of the path of the rays in an analytical or precision balance according to the invention, Figure 2 is a greatly enlarged section of the micro-scale shown in Fig. 1, Figure 3 is a part section of a ground glass screen showing a 100-part comparison scale, Figure 4 shows an exemplified embodiment for a ground glass screen of an analytical balance according to the invention, Figure 5 shows an exemplified embodiment for a ground glass screen of a precision balance according to the invention, Figures 6 and 7 show enlarged sections of the image on the ground glass screen shown in Figs. 4 and 5 in two operative positions, and Figure 8 shows a general view in perspective of a precision balance according to the invention.

The single-pan precision balance 20 (Figure 8) according to the invention has a single pan 20' and a reading window denoted generally by 21, and illustrated in detail in Figure 5. An analytical balance according to the invention is built substantially in the same manner. Its rather different reading window is illustrated in Figure 4.

The reading window 21 comprises essentially a ground glass screen 7 on which the weight values may be read.

Figure 1 shows the path of the rays in the projection arrangement of an analytical or precision balance according to the invention.

Upon the balance beam 22, which is rockable about the knife edge 23 defining a horizontal axis, there is a rigidly connected pointer 24 pointing substantially vertically downwards and on the bottom end of which a micro-scale 1 is fastened. The 100-part micro-scale 1, of which a section is illustrated in Figure 2, is projected with suitable magnification through an optical system having a light source 2, a condenser 3, a lens 4 and deviating mirrors or prisms 5 and 6 onto the ground glass screen 7 of special construction, a section of which is illustrated in Figure 3. Said ground glass screen carries the stationary comparison scale 8 designed as a transverse scale, including ten individual scales marked 0, 1, . . . 9 which are offset in relation to one another by 1/10 of a division interval. The first of these scales marked 0 has ten division intervals and the remainder have nine each, all of said division intervals being equal to one another. The dividing lines of the first individual scale marked 0 and the juxtaposed individual scales marked 1 . . . 9 are numbered in the vertical and horizontal directions with figures from 0 to 9. These figures, like the dividing lines, are for example made transparent, while the other parts of the ground glass screen, with the exception of a vertical window 9 (Figs. 4 and 5), on the left at the side of the scale, are covered over with black.

Through the mirror arrangement illustrated the effect is achieved that an image 25 (Figs. 6 and 7) of the horizontally rocking micro-scale 1 fastened on the pointer 24 is projected onto the ground glass screen 7 at an angle of 90°. The image 26 of the dividing line 10 (Figs. 4 and 5) of the micro-scale 1 which at the moment in question falls within the range of the comparison scale 8 thus travels from top to bottom on the ground glass screen 7 with increasing weight, so that its coincidence with the corresponding dividing line 10 of the 100-part comparison scale formed by the individual scales marked 0 . . . 9 may be ascertained (see Figures 4 and 5).

By a simple device, the reading of the luminescent image may be combined with the milligramme indication on the ground glass screen 7 and also if desired with a mechanical weight positioning device. For this purpose, each dividing line 10 of the micro-scale 1 is associated with a transparent numeral 11 of a scale 27 (Figure 2), which indicates the corresponding miligramme tens and hundreds. These figures appear in the vertical window section 9 of the ground glass screen 7 (Figures 4 and 5) and travel downwards with the dividing line 10. In order to prevent that all the figures of the vertical row of figures, indicating the milligramme units, of the comparison scale 8 are visible simultaneously, the diapositive 27 carrying the micro-scale 1 is provided with a plurality of rectangular transparent recesses 12 (Figure 2) co-ordinated, respectively, with the dividing lines 10. Their length is so selected that only the figure of the vertical row of figures which is applicable at the moment in question becomes entirely visible in the images 12' of the transparent recess 12 on the ground glass screen 7 (see Figures 4, 5, 6 and 7). Thus in the limit positions of the first decimals appearing in the window 9 the new bottom figure (3) is already completely visible in the zero position shown in Figs. 4 and 6, while the old top figure (2) has already partly disappeared, whereas in the limit positions shown in Figs. 5 and 7 in which the fourth decimal has the value 9, the old top figure (3) is fully visible while the new bottom figure (4) is partly covered (Figure 7). In this way, mistakes in reading the weight are avoided. Thus for example in Figure 6 the reading is 93.0 mg., while in Figure 7 the weight reading is 93.9 mg.

In addition to the stationary ground glass screen scale 8, a further window 13 (Figure 4) which is not matt can also be provided, in which the weight values laid on by hand are shown.

What I claim is:

1. In a precision balance having a pointer rigidly connected at one end thereof with a balance beam provided with a horizontal pivot axis, in combination, a part fastened to the other end of the pointer, said part being provided with a micro-scale, a plurality of dividing lines and means for uncovering one digit of said micro-scale and part of the next digit, a ground glass screen having transverse scale means including ten scales with 10 divisions in each scale and offset in relation to one another, and means for projecting on said ground glass screen an image of said micro-scale and including said means for uncovering one of said dividing lines and digit and a part of the next line and digit.

2. In a balance as claimed in claim 1, said micro-scale being arranged for swinging about a horizontal pivotal axis so as to produce a projecting light beam swinging in a substantially horizontal plane, and means for projecting said horizontal light beam as a light beam swinging in a substantially vertical plane at the screen surface, said transverse scale means of said ground glass screen being disposed substantially in said vertical plane.

3. In a balance as claimed in claim 2, said micro-scale together with said pointer carrying the same having a center of gravity placed substantially at the level of said micro-scale so as to reduce the angle of deflection of said projecting light beam to such an extent that the maximum angular error of the same is smaller than a fraction of the interval of each scale of said division of said transverse scale means of said ground glass screen.

4. In a balance as claimed in claim 1, said micro-scale provided with said micro-scale being designed as a diapositive having a plurality of rectangular transparent recesses associated, respectively, with said dividing lines, said recesses having a length rendering only one figure and part of the next one of said micro-scale fully visible on said ground glass screen.

References Cited in the file of this patent

UNITED STATES PATENTS

| | | |
|---|---|---|
| 1,357,731 | Schaper | Nov. 2, 1920 |
| 1,631,341 | Schaper | June 7, 1927 |
| 1,830,050 | Carroll | Nov. 3, 1931 |
| 1,947,155 | Fuller | Feb. 13, 1934 |
| 1,973,685 | Marshall | Sept. 11, 1934 |
| 1,974,606 | Fassin | Sept. 25, 1934 |
| 2,334,367 | Williams | Nov. 16, 1943 |
| 2,638,031 | Stockwell | May 12, 1953 |